No. 695,843. Patented Mar. 18, 1902.
J. L. SUTTON.
DRAFT EQUALIZER.
(Application filed Jan. 23, 1902.)
(No Model.)
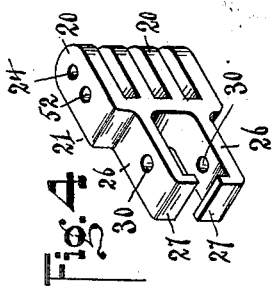
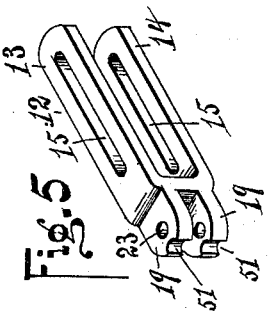
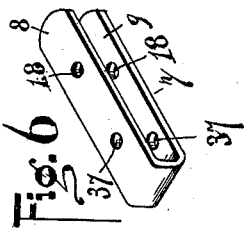
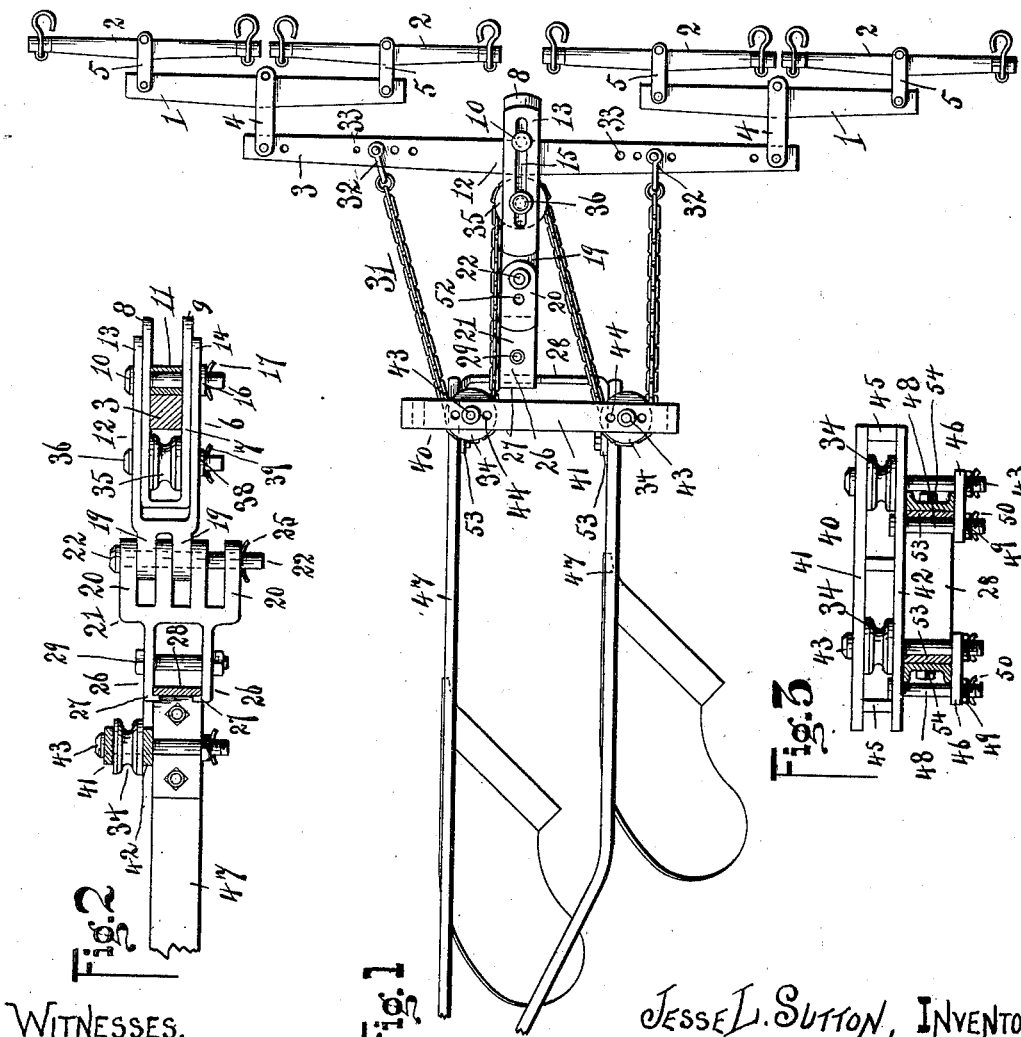
WITNESSES.
C. N. Woodward
E. P. Alexander
JESSE L. SUTTON, INVENTOR
BY ATT'Y.

UNITED STATES PATENT OFFICE.

JESSE L. SUTTON, OF BRIMFIELD, ILLINOIS.

DRAFT-EQUALIZER.

SPECIFICATION forming part of Letters Patent No. 695,843, dated March 18, 1902.

Application filed January 23, 1902. Serial No. 90,920. (No model.)

*To all whom it may concern:*

Be it known that I, JESSE L. SUTTON, a citizen of the United States, residing at Brimfield, in the county of Peoria and State of Illinois, have invented certain new and useful Improvements in Draft-Equalizers, of which the following is a specification, reference being had therein to the accompanying drawings.

This invention relates to that class of draft appliances known as "draft-equalizers" for equalizing the pull of two or more horses or two or more teams upon an agricultural implement or vehicle.

While the invention is adapted for use with vehicles, I have especially designed it for use with gang-plows for the purpose of getting a straight pull on each plow, taking off all side draft, and making the labor of the teams much easier than with ordinary draft appliances.

The invention consists in the parts and combinations thereof set forth and claimed hereinafter.

In order to make the invention more clearly understood, I have shown in the accompanying drawings means for carrying the same into practical effect without limiting my improvements in their useful applications to the particular construction which for the sake of illustration I have delineated.

Figure 1 is a plan view of a draft-equalizer embodying my invention applied to a plow-gang. Fig. 2 is a side elevation, partly in section, of the principal parts of the equalizer, the flexible draft device or chain being omitted. Fig. 3 is a rear view, partly in section, of the pulley-carrier and draft-frame by which the equalizer is connected with the plow-gang. Figs. 4, 5, and 6 are perspective views of the clamp-clevis, the guide-clevis, and the sliding clevis, respectively.

Referring to the drawings, in which are shown in Fig. 1 means for hitching two teams of two horses each, 1 indicates the doubletrees, 2 the whiffletrees, and 3 the equalizing-bar, with which at each side of its pivotal point the doubletrees are connected by links 4. The whiffletrees are connected with the doubletrees by links 5, these links, as well as the links 4, being of such character as to support the whiffletrees and doubletrees in substantially the same horizontal plane as the equalizing-bar 3 to prevent said parts from sagging or dragging. To this end the links 4 and 5 may be made of two members, one above and one below the parts which they connect.

6 indicates the draft-frame, connected with the implement or vehicle in any suitable manner. Relative to this frame the equalizing part has a longitudinal movement—that is to say, movement in the direction of the line of draft—at the same time being supported and guided in substantially a horizontal plane. To this end the equalizing-bar 3 is carried in a sliding clevis 7, Fig. 6. This clevis is preferably of U shape, having upper and lower members 8 and 9, between which the equalizing-bar is pivoted by a bolt 10, passing through a bearing 11, attached to the bar. The clevis 7 is mounted to slide in a guide-clevis 12, Fig. 5, having upper and lower members 13 14, in which are formed slots 15. Through these slots the bolt 10 passes and is held in place by its head above the clevis 12 and a removable collar 16 and pin 17 on and in the bolt at the under side of the clevis. The pivot-holes for the bolt in the clevis 7 are shown at 18. At its rear end the guide-clevis 12 is formed with one or more horizontal lugs 19, adapted to fit in corresponding spaces between horizontal lugs 20, which latter are formed at the forward end of the clamp-clevis 21. The latter clevis is provided with a sufficient number of lugs 20, one above the other, to provide for the necessary vertical adjustment of the guide-clevis 12. In the construction shown there are four of the lugs 20, thus allowing four different vertical positions for the clevis 12. After adjustment the parts 12 and 21 are pivotally united by the vertical bolt 22, passing through apertures 23 and 24 in the lugs 19 and 20, respectively. At its lower end the bolt 22 is held in place by a pin 25. At its rear end the clamp-clevis is provided with arms of suitable position and distance apart to enable them to be clamped to the draft-frame of the implement or vehicle. In this instance the arms (shown at 26) are horizontal, sufficiently long to have a slight spring, and provided at their rear ends with inwardly-projecting lips 27.

The draft-frame consists in the present construction of a cross-bar 28, having a vertical web or member adapted to be engaged by the arms 26, as shown in Fig. 2. This arrangement admits of lateral adjustment of the equalizer as a whole upon the draft-frame. When properly adjusted, the arms 26 are firmly clamped upon the frame 28 by a vertical bolt 29, passing through apertures 30 in the arms 26 of the clamp-clevis.

The equalizing takes place through a flexible draft device 31, which may be a chain, wire, rope, or other suitable means. The ends of said chain are pivotally connected at 32, with the equalizing-bar 3 at each side of its center, and a suitable number of holes 33 or equivalent means of adjustment are provided in the equalizing-bar to admit of attaching the ends of the flexible draft device at the desired distance from the pivot 10, according to the relative strengths of the teams or the desired draft upon the implement. The chain 31 passes backward from the arms of the equalizing-bar around pulleys 34, mounted on the draft-frame or on a neighboring part of the vehicle or implement, and the middle part of the chain is carried by a pulley 35, supported in the sliding clevis 7 at the rear of the equalizing-bar, where it is journaled by a bolt 36, passing through the slots 15 and through apertures 37 in the rear part of the clevis 7. The pulley 35 might be otherwise mounted to move with the equalizing-bar—as, for instance, on the bolt 10; but I prefer the construction shown as better adapted to keep all parts of the equalizer in substantially the same horizontal plane. The bolt 36 is confined at its lower end by a collar 38 and pin 39.

The pulleys 34 are preferably both mounted in a pulley-carrier 40, having upper and lower members or bars 41 42, between which the pulleys are journaled on bolts 43, passing through apertures 44 in said members. Bars 41 42 are spaced apart by interposed blocks 45. Means for laterally adjusting the pulleys 34 in the carrier 40 are provided by a transversely-extending series of holes 44, as shown in Fig. 1. The carrier 40 as a whole is adapted to be clamped to the draft-frame 28 or to the vehicle or implement frame by any suitable means. I prefer the devices shown in Figs. 2 and 3, in which the clamping-plates 46 are adapted to engage the under side of the draft-frame or plow-beam 47 and be drawn against the bottom of the plate 42 by bolts 48 and nuts 49, the latter being retained by pins 50. I further provide for allowing the clevises 7 and 12, with the equalizing-bar, to swing laterally upon the pivot 22, as is evident from the construction so far described, or to be locked in place, so that any side draft in turning shall take place at the pivot 10 instead of at the pivot 22. This I accomplish by forming a suitable lock between the parts 12 and 20, as by providing the rear ends of the lugs 12 with notches 51, adapted to be engaged by a suitable bolt passed down through corresponding holes 52 in the clamping-clevis.

It will be seen that the equalizer as a whole may be laterally adjusted to bring the draft of the respective limbs of the flexible device 31 in the desired line with the plow-beams, that in turning the said device 31 will run on the pulleys, allowing the equalizing-bar to turn and at the same time giving to each team its share of the draft, and that while the equalizing-bar is centrally pivoted and supported it may move longitudinally relatively to the draft-frame to keep all parts of the chain 31 taut in all positions.

The draft-frame 28 is shown as formed with longitudinally-extending arms 53, adapted to lie parallel with the beams 47, to which they are secured by bolts 54; but it will be understood that the draft-frame may be otherwise attached without departing from my invention.

What I claim is—

1. In a draft-equalizer, the combination of a draft-frame, an equalizing-bar pivotally mounted relative to said frame, a flexible draft device connecting said frame with the arms of the equalizing-bar, the said bar having a longitudinal movement relative to the draft-frame, and a connection between the median portion of the flexible draft device and the equalizing-bar, whereby said portion of the draft device is carried with the equalizing-bar in its longitudinal movement.

2. In a draft-equalizer, the combination of a draft-frame, an equalizing-bar mounted to turn in horizontal planes relative to said frame, pulleys on said frame and bar, and a flexible draft device connected with the ends of said bar and passing around the pulleys, the equalizing-bar having a longitudinal movement relative to the draft-frame.

3. In a draft-equalizer, the combination of a draft-frame, an equalizing-bar mounted to turn in horizontal planes relative to said frame, a slide carrying said bar, a guide for said slide carried by said frame, and a flexible draft device connecting the arms of the equalizing-bar with the draft-frame.

4. In a draft-equalizer, the combination of a draft-frame, an equalizing-bar mounted to turn in horizontal planes relative to said frame, a slide-clevis carrying said bar, a guide-clevis in which said slide-clevis is longitudinally movable, a clamp-clevis carrying said guide-clevis and connected with said frame, and a flexible draft device connecting the arms of the equalizing-bar with the draft-frame.

5. In a draft-equalizer, the combination of an equalizing-bar, a slide-clevis carrying said bar and in which the bar is mounted to turn in horizontal planes, a guide-clevis in which said slide-clevis is longitudinally movable, a clamp-clevis carrying said guide-clevis and having means for adjustable connection with the draft-frame, pulleys adapted to be attached to a draft-frame and a flexible draft device connected with the arms of the equalizing-bar and passing around said pulleys.

6. In a draft-equalizer, the combination of an equalizing-bar, a support in which said bar is mounted to turn in horizontal planes, means for connecting said support pivotally with the draft-frame, and a locking device whereby said support may be held from turning on its pivot, said equalizing-bar having a flexible draft device whereby it may be connected with a draft-frame.

7. In a draft-equalizer, the combination of an equalizing-bar, a support in which said bar is mounted to turn in horizontal planes, means for connecting the said support with the draft-frame, a central pulley connected with the equalizing-bar, pulleys and a carrier therefor adapted for removable connection with a draft-frame, and a flexible draft device connected with the equalizing-bar and passing around said pulleys.

8. The combination with plow-beams carrying plows or gangs thereon, of a draft-equalizer having pulleys mounted substantially in the lines of draft of said beams respectively, an equalizing-bar mounted to turn in horizontal planes, means for supporting said bar relative to the plow-beams, a pulley connected with said bar and a flexible draft device connected with the arms of said bar and passing around said pulleys.

9. The combination with plow-beams carrying plows or gangs thereof, of a draft-equalizer having an equalizing-bar and a flexible draft device having attachments to two of said beams, in substantially the lines of draft thereof, and to the equalizing-bar.

10. The combination with plow-beams carrying plows or gangs thereof, of a draft-equalizer having an equalizing-bar, a flexible draft device having attachments to two of said beams and to the equalizing-bar, and means for adjusting the equalizing-bar and its pivot laterally relative to said attachments to said beams.

11. The combination of a draft-frame and a draft-equalizer having an equalizing-bar, a flexible draft device having two points of attachment to said frame and having attachments to said bar, and means for adjusting the equalizing-bar and its pivot laterally relative to said attachments to said frame.

12. The combination of a draft-frame, an equalizing-bar having a pivot and for said pivot a support which is vertically adjustable relative to said frame, and a flexible draft device connecting the equalizing-bar with the draft-frame.

13. In a draft-equalizer for plows and other purposes, the combination of an equalizing-bar, a pivotal support for the same, a pulley connected with the equalizing-bar, a transverse draft-bar adapted for attachment to the plows, pulleys connected with the draft-bar, a flexible draft device passing around said pulleys and connected at its ends with the equalizing-bar, and means for adjusting the said pivotal support laterally relative to the latter pulleys.

In testimony whereof I affix my signature in presence of two witnesses.

JESSE L. SUTTON.

Witnesses:
EPHRAIM LINDLY,
JANES FINEY.